(12) United States Patent
Michel et al.

(10) Patent No.: US 11,633,900 B2
(45) Date of Patent: Apr. 25, 2023

(54) DEVICE FOR HANDLING PREFORMS FOR HEATING UNITS

(71) Applicant: SIDEL PARTICIPATIONS, Octeville-sur-Mer (FR)

(72) Inventors: Jocelyn Michel, Octeville-sur-Mer (FR); Sébastien Fevre, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 67 days.

(21) Appl. No.: 17/219,774

(22) Filed: Mar. 31, 2021

(65) Prior Publication Data

US 2021/0308931 A1     Oct. 7, 2021

(30) Foreign Application Priority Data

Apr. 1, 2020 (FR) ...................... 2003248

(51) Int. Cl.
| | |
|---|---|
| *B29C 49/42* | (2006.01) |
| *B29C 49/64* | (2006.01) |
| *B29K 67/00* | (2006.01) |
| *B29L 31/00* | (2006.01) |

(52) U.S. Cl.
CPC ...... *B29C 49/6463* (2013.01); *B29C 49/6418* (2013.01); *B29K 2067/003* (2013.01); *B29L 2031/712* (2013.01)

(58) Field of Classification Search
CPC .......... B29C 49/4205; B29C 49/42065; B29C 49/42071
See application file for complete search history.

(56) References Cited

U.S. PATENT DOCUMENTS

| | | | |
|---|---|---|---|
| 8,992,208 B2 | 3/2015 | Linke et al. | |
| 2003/0034231 A1* | 2/2003 | Palisca | B29C 49/4205 198/803.8 |
| 2013/0087964 A1* | 4/2013 | Zhang | B23Q 3/00 269/287 |

FOREIGN PATENT DOCUMENTS

| | | |
|---|---|---|
| DE | 102014017546 A1 | 6/2016 |
| DE | 102017124186 A1 | 4/2019 |
| EP | 3228438 A1 | 10/2017 |

OTHER PUBLICATIONS

French Search Report dated Nov. 23, 2020.

* cited by examiner

*Primary Examiner* — Robert B Davis

(57) ABSTRACT

The invention concerns a device for handling preforms for heating units. The device includes a mandrel that defines a rotation axis of the preforms; a tip mounted at an end of the mandrel and having a part penetrating into the neck of the preforms; a rubbing contact rigidly connected to the tip; and a heatsink rigidly connected to the mandrel and intended to come into contact with the tip. The tip also includes a cooling part axially in line with the penetrating part. The cooling part includes at least one thermal exchange raised portion in contact with the surrounding air. Furthermore, the tip is mounted such that it can be mobile on the mandrel.

14 Claims, 5 Drawing Sheets

Fig. 1 - Prior Art

DEVICE FOR HANDLING PREFORMS FOR HEATING UNITS

FIELD OF INVENTION

The field of the invention is that of the design and manufacture of plastic material containers. More precisely, the invention concerns units for heating plastic material preforms in order to deform them to obtain a finished container.

BACKGROUND

To be even more precise, the invention concerns a heating unit device for handling preforms.

By preforms is meant both the blanks obtained by molding and the intermediate containers formed from blanks having undergone at least one deformation step but not having the final shape of the container.

A plastic material container is classically formed by blowing or stretching-blowing from a preform that comprises a substantially cylindrical body closed by a hemispherical bottom and, at the opposite end, an open neck having its final shape and separated from the body by a flange.

To enable forming of the container, the body and the bottom of the preform are heated to soften them by raising them to a temperature (termed the heating temperature) higher than the glass transition temperature of the material.

In the case of PET, which has a glass transition temperature of approximately 80° C., the heating temperature is generally approximately 120° C.

The preform is normally heated in a heating unit equipped with luminous radiation sources (generally halogen lamps or laser diodes).

To this end the preform is mounted on a turning support termed a "spinner" that comprises a shaft provided at one end with a mandrel cooperating with the neck and at another end with a pinion meshing with a rack. The spinner causes the preform to move in front of the luminous radiation sources while driving it in rotation to expose the whole of the body to the luminous radiation from the luminous radiation sources.

During heating it is necessary to limit or even to prevent the necks of the preforms from being heated, which could lead to deformation thereof.

In fact, there is no call to deform the necks, which have their final shape.

Deformation of the necks could make it inappropriate to market the containers, in particular through the impossibility of fitting caps to close the containers once filled.

To prevent heating of the necks mandrels have been developed to enable the necks to be grasped from the outside by means of a ring.

These mandrels do not enable optimum protection of the necks, in particular because the luminous radiation emitted by the luminous radiation sources is reflected at the walls of the preform, inside the latter, until they reach the neck and heat it.

Tips placed inside the rings and therefore the necks have then been integrated into the mandrels so as to reflect the luminous radiation directed toward the neck.

Thus, with the rings the tips produce a restricted annular space in which the neck of the preforms is intended to be housed.

This therefore implies very precise adjustment of the positioning of the preforms on the entry thereof into the heating unit, before they are taken up by the mandrels.

Other mandrels hold the preforms from inside the necks only by means of a tip.

This in particular enables the risk of damaging the necks of the preforms to be limited even if the precise adjustment of the position of the preforms for them to be handled by the mandrels is still necessary.

Although they are protected from direct luminous radiation during the heating of the preforms, the mandrels and in particular their tips are heated as they pass through high-temperature areas of the heating unit, that is to say in the vicinity of the luminous radiation sources.

It is therefore necessary to cool the mandrels to prevent their heat alone enabling deformation of the necks of the preforms.

SUMMARY OF THE INVENTION

To this end, as is described in the patent document published under the number EP3 228 438, the mandrels comprise heatsinks enabling dissipation of the calories by circulation of air.

To be more precise, the heatsink is attached to the shaft and intended to come into contact with the tip to enable a dissipation of calories by thermal conduction.

During the handling and the offloading of the preforms, the mandrels are far away from the high-temperature areas of the heating unit, which enables cooling thereof via the heatsinks.

However, the continual increase in production throughputs tends to reduce the time for cooling the mandrels since the handling and the offloading of the preforms are ever more rapid.

The mandrels therefore continue to be heated but cannot be cooled as much as necessary, which can lead to a risk of deformation of the neck of the preforms.

The invention has in particular the objective of alleviating the drawbacks of the prior art.

To be more precise, the invention has for objective to propose a solution that enables reliable handling of the preforms whilst avoiding heating the neck of the preforms.

The invention also has for objective to provide a solution of this kind that is simple to use and to maintain.

The above objectives and others that will become apparent hereinafter are achieved thanks to the invention which has for object a device for handling preforms for heating units, comprising:

- a mandrel defining a rotation axis of the preforms;
- a tip mounted at a first end of the mandrel and having a part penetrating into the neck of the preforms;
- means for rubbing contact with the preform, rigidly connected to the tip,
- a heatsink rigidly connected to the mandrel and intended to come into contact with the tip, characterized in that the tip also comprises a cooling part axially in line with the penetrating part, the cooling part including at least one thermal exchange raised portion in contact with the surrounding air, and in that the tip is mounted to be mobile on the mandrel.

The cooling part enables cooling of the tip by contact with the surrounding air and/or forced ventilation air.

In fact, when the preforms are in front of the luminous radiation sources in order to be heated, the luminous radiation heats the tip, which it is then necessary to cool.

When the preforms are offloaded, and before taking up a new preform via the tip, the air in which the handling devices move is then relatively cold to enable cooling of the tip by circulation along the cooling part of the tip.

Moreover, the mobility of the tip on the mandrel enables flexible handling of the preforms without exerting too great a force on the wheel holding the preforms before they are taken up by the handling devices.

Moreover, this mobility makes it possible to be able to bring the tip into contact with the heatsink to enable also cooling by conduction between the tip and the heatsink.

The presence of the cooling part enables the tip to be at a low utilization temperature on starting the heating cycle, despite a phase of increasing the temperature of the oven. During this increase in temperature phase the tips, although protected, may increase in temperature by convection given the temperature in the oven. In other words, in production, the tip with the cooling part enables a lower operating temperature to be maintained than if there were no cooling part on the tip.

The cooling part preferably comprises at least two raised portions spaced axially from one another.

This in particular makes it possible to increase the thermal exchanges between the tip and the surrounding air, with the aim of offering better cooling of the tip.

The or each raised portion is advantageously formed of an annular flange that extends radially around the mandrel.

A flange therefore has three faces intended to come into contact with the surrounding air, in order to increase the thermal exchanges and therefore the cooling of the tip.

At least one of the raised portions of the cooling part preferably has an overall dimension greater than an overall dimension of the penetrating part.

Thus, the raised portion having an overall dimension greater than the overall dimension of the penetrating part enables an abutment to be formed for the depression of the penetrating part into the neck of the preforms.

In accordance with a preferred embodiment, the penetrating part and the cooling part of the tip form a one-piece assembly.

This enables easy mounting and demounting of the tip on and from the shaft but also makes it possible to favor the cooling of the penetrating part by the cooling part.

The tip preferably comprises at least two angular sectors in each of which the penetrating part and the cooling part of the tip are in one piece.

This in particular enables a tip to be produced by molding, or at least sectors of the tip to be produced by molding, which offers easy and relatively low-cost manufacture.

Moreover, this makes it possible to limit the number of components of the tip and therefore to facilitate both mounting and maintenance thereof.

In accordance with another advantageous embodiment, the penetrating part and the cooling part of the tip are integral with one another.

Thus, it is possible to obtain a one-piece tip that can be produced by molding. This therefore facilitates both manufacture but also use of the tip and therefore of the handling device. Moreover, this facilitates the transfer of calories from the penetrating part to the reflective part.

The rubbing contact means are advantageously integrated into the penetrating part and take the form of at least one radial projection.

This further limits the number of components constituting the tip, to the benefit of its manufacture, cost and ease of use.

The mandrel preferably has a reflective solid surface at its first end, intended to form means for reflecting luminous radiation from luminous radiation sources of heating units.

This reflective solid surface therefore makes it possible to prevent the luminous radiation emitted by the luminous radiation sources heating the tip of the handling means, which avoids excessive cooling to be applied to the handling means and in particular to the tip.

In accordance with another embodiment, the mandrel has at its first end a shoulder intended to form an abutment in translation of the tip on the mandrel.

The relative movement of the tip on the mandrel is then limited between the shoulder and the heatsink so as to allow gentle handling of the preforms whilst ensuring optimum cooling of the tip by the latter coming to abut on the heatsink.

The shoulder of the mandrel advantageously includes an annular groove in which is received an annular bead carried by the penetrating part of the tip.

The cooperation of the bead with the annular groove enables the tip to be centered on the mandrel and the translation movement of the tip on the mandrel to be guided.

The invention also concerns a unit for heating preforms comprising at least one device for handling preforms as described above.

BRIEF DESCRIPTION OF THE DRAWINGS

Other features and advantages of the invention will become more clearly apparent on reading the following description of various embodiment, when taken in conjunction with the accompanying drawings.

DETAILED DESCRIPTION

Figure 1:
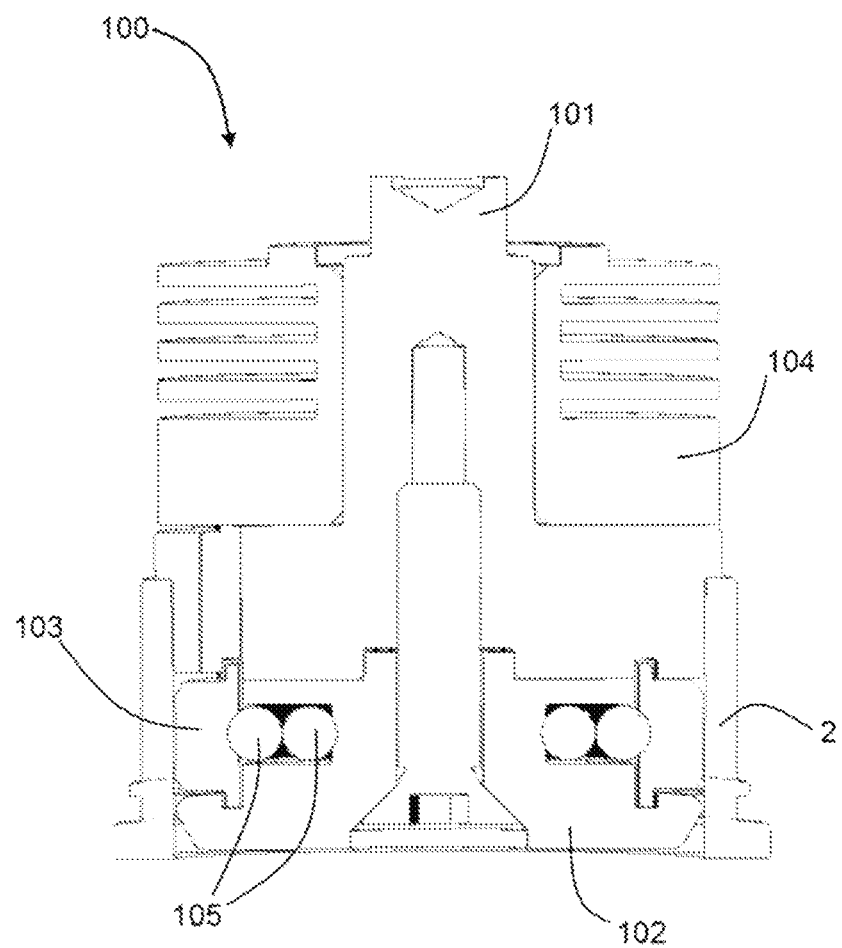
FIG. 1 is a schematic view in cross section of a prior art device for handling preforms.

As illustrated in FIG. 1, a prior art device 100 for handling preforms 2 comprises a mandrel 101, a support 102 mounted at a first end of the mandrel 101, means 103 for rubbing contact with a preform 2 attached to the support 102, and a heatsink 104 rigidly connected to the mandrel 101.

The rubbing contact means 103 are more particularly formed of a ring mounted between the mandrel 101 on the one hand and the support 102 on the other hand.

The ring comprises a plurality of angular sectors.

Each angular sector is mounted between the mandrel 101 and the tip 102 in such a manner as to compress radially O-rings 105 enabling radially outward spreading of the sectors of the ring to force rubbing contact of the ring with the interior of a neck of the preforms 2.

In operation, the handling device 100 is inserted by force into the neck of the preforms 2.

To be more precise, the support 102 is inserted into the neck of the preforms 2 so that the rubbing contact means 103 are pushed radially toward the mandrel 101 and, by reaction, the O-rings 105 push the sectors of the ring against the neck of the preform 2 to retain it by friction.

This operation therefore generates high forces applied by the handling device 100 to the preforms 2 during handling and releasing the preforms 2.

Moreover, when heating the preforms 2, the support 102 rises in temperature and can be cooled only by its contact with the heatsink 104 of the handling device 100.

Also, as the cycles proceed, the support 102 rises in temperature, which prevents good cooling thereof and may in the long run generate damage to the preform 2 and more particularly deformation of the neck of the preform 2 that may prevent fitting a cap onto the formed container. Moreover, bad cooling could generate damage to the machine for manufacturing the containers, for example linked to bad stripping of the preforms on leaving heating.

A device 1 in accordance with the invention for handling preforms 2 is described with reference to FIGS. 2 to 5.

Figure 2:
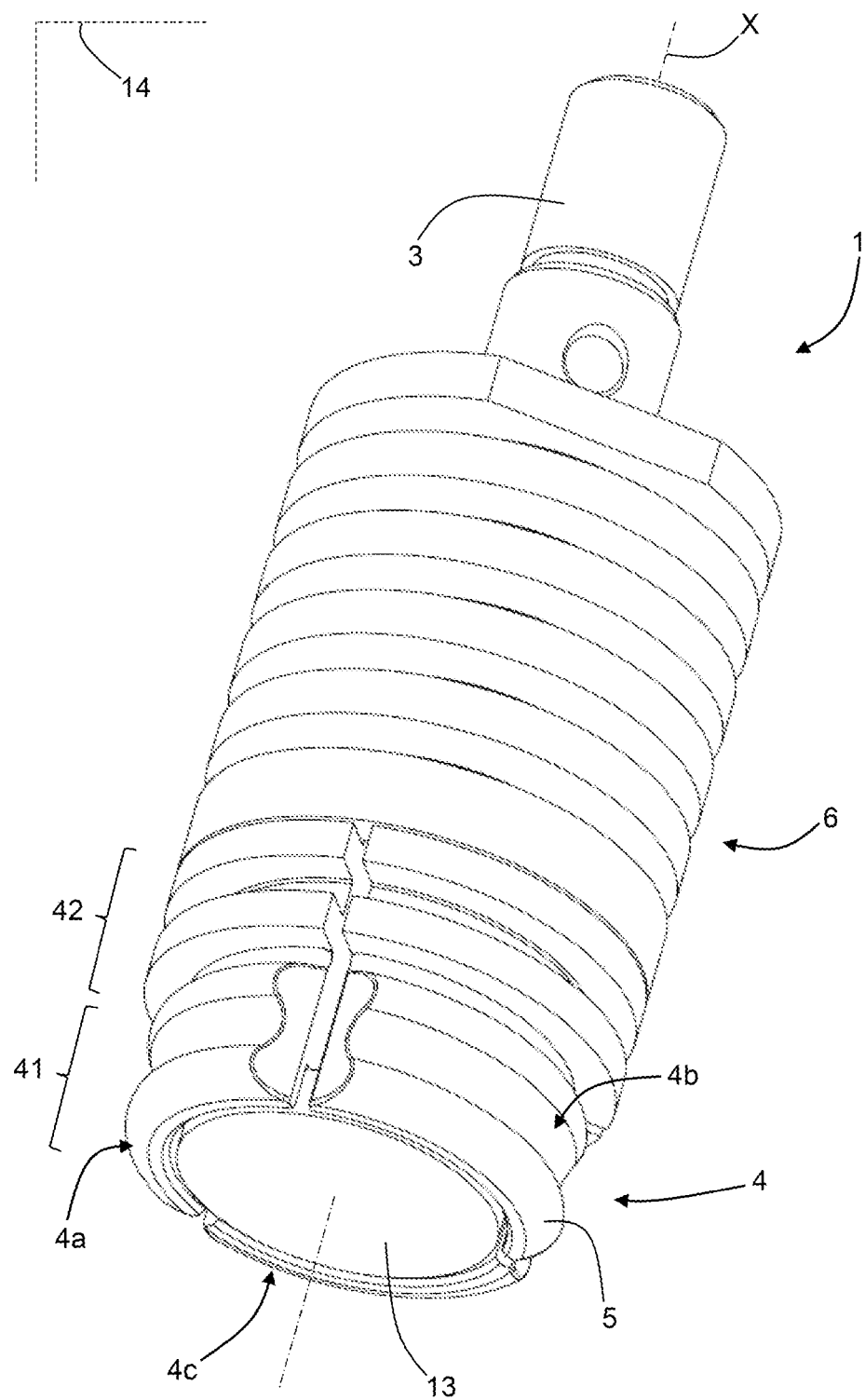
FIG. 2 is a perspective view of a device in accordance with the invention for handling preforms.
Figure 3:
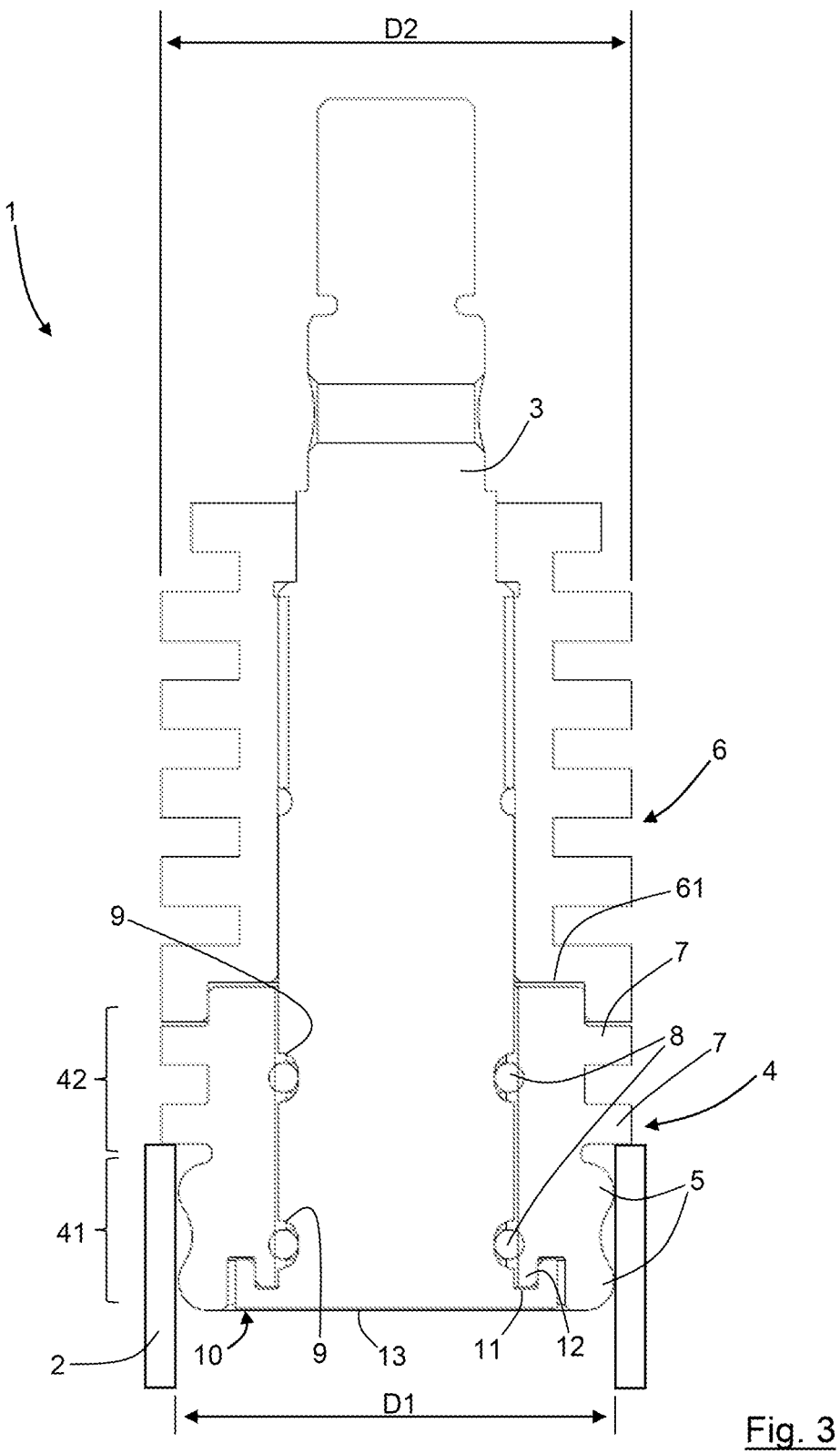
FIG. 3 is a view in cross section of the device in accordance with the invention for handling preforms.

As illustrated in FIGS. 2 and 3, the device 1 in accordance with the invention for handling preforms 2 comprises:
- a mandrel 3 defining a rotation axis X of the preforms 2;
- a tip 4 mounted at a first end of the mandrel 3 and including a part 41 penetrating into the neck of the preforms 2;
- means 5 for rubbing contact with the preform 2, attached to the tip 4;
- a heatsink 6 attached to the mandrel 3 and intended to come into contact with the tip 4.

The handling device 1 in accordance with the invention differs from the prior art one in that the tip 4 also comprises a cooling part 42 axially in line with the penetrating part 41.

To be more precise, as can be seen in FIGS. 2, 3, 4 and 5, the cooling part 42 features at least one raised portion 7 for thermal exchange through contact with the surrounding air.

In accordance with the present embodiment, the cooling part comprises at least two raised portions 7 spaced axially from one another.

The or each raised portion 7 is formed of an annular, or quasi-annular, or circular-arc-shaped flange that extends radially around the mandrel 3.

As illustrated by FIG. 3, at least one of the raised portions 7 of the cooling part 42 has an overall dimension greater than an overall dimension of the penetrating part 41.

To be more precise, the penetrating part 41 of the tip 4 has a first diameter D1 less than the diameter D2 of the at least one of the raised portions 7 of the cooling part 42.

This makes it possible, firstly, to be able to cool the tip 4 and, secondly, to form an abutment limiting depression of the penetrating part 41 into the neck of the preforms 2.

With reference to FIGS. 2, 3, 4 and 5, the tip 4 features two raised portions 7 spaced axially from one another, each raised portion 7 having a diameter D2 identical to that of the other.

The two raised portions 7 therefore have an overall diameter greater than the overall diameter of the penetrating part 41, which makes it possible to increase the area of cooling of the tip 4 in contact with air.

As illustrated in FIG. 3, the tip 4 is mounted on the mandrel 3 via a pair of O-rings 8. Here the O-rings 8 are elastically deformable elements.

The mandrel 3 more particularly features at the level of its first end two annular grooves 9 axially spaced from one another inside which O-rings 8 are partly received.

To be more precise, an O-ring 8 is partly received in each of the annular grooves 9.

As will be described hereinafter, this makes it possible to favor the retention by friction of the preforms 2 on the tip 4 but also centering the tip 4 and maintaining it in position on the mandrel 3.

Moreover, as illustrated in FIG. 3, at its first end the mandrel 3 includes a shoulder 10 intended to form an abutment limiting translation movement of the tip 4 on the mandrel 3.

The shoulder 10 of the mandrel 3 more particularly includes an annular groove 11 in which is received an annular bead 12 carried by the penetrating part 41 of the tip 4.

The cooperation between the annular bead 12 and the annular groove 11, complementing the action of the O-rings 8, makes it possible to keep the tip 4 centered on the mandrel 3, in particular when it rotates, but also guiding translation movement of the tip 4 on the mandrel 3.

As illustrated in FIGS. 2, 3, 4 and 5, the rubbing contact means 5 are integrated into the penetrating part 41 of the tip 4 and take the form of at least one radial projection.

The rubbing contact means 5 more particularly take the form of two radial projections axially spaced from one another and both forming a set of waves.

As illustrated in the FIG. 3 sectional view, each radial projection of the rubbing contact means 5 has an identical diameter.

However, one of the radial projections could have a diameter less than that of the other. The radial projection at the greater distance from the heatsink 6 preferably has a smaller diameter than the radial projection nearer the heatsink 6.

As can be seen in FIGS. 2 and 3, the mandrel 3 has at its first end a reflective solid surface 13 intended to form means for reflecting luminous radiation from luminous radiation sources of a heating unit 14.

The reflective solid surface 13 therefore makes it possible to prevent heating of the mandrel 3 and of the tip 4 by the luminous radiation emitted by the luminous radiation sources of the heating unit 14.

Thus, thanks to the presence of this reflective solid surface 13, the cooling of the tip 4 does not need to be intense.

In operation, despite the reduced time of presence outside the heating unit 14, in particular as a consequence of the increased production throughputs, the simple presence of the raised portions 7, in the form of flanges, of the cooling part 42 then makes it possible for the tip 4 in contact with the surrounding air to be appropriately cooled to prevent any damage to the preforms 2.

The raised portions 7 in the form of flanges enable cooling of the tip 4 during heating thanks to forced air, in particular by ventilation.

The cooling part 42 and the penetrating part 41 of the tip 4 preferably form a one-piece assembly.

In other words, the penetrating part 41 and the cooling part 42 of the tip 4 may be manufactured independently of one another but are assembled in a definitive manner in order to be used on the handling device 1.

The tip 4 of the handling device 1 in accordance with the invention is more particularly made of stainless steel or of a specific form of aluminum, in particular for reasons of contact with a container intended to contain a foodstuff product.

The penetrating part 41 may therefore be assembled with the cooling part 42 of the tip 4 by welding for example.

In accordance with an advantageous embodiment, the penetrating part 41 of the tip 4 and the cooling part 42 are made in one piece.

In other words, the penetrating part 41 and the cooling part 42 of the tip 4 are for example produced by molding or by machining.

Figure 4:
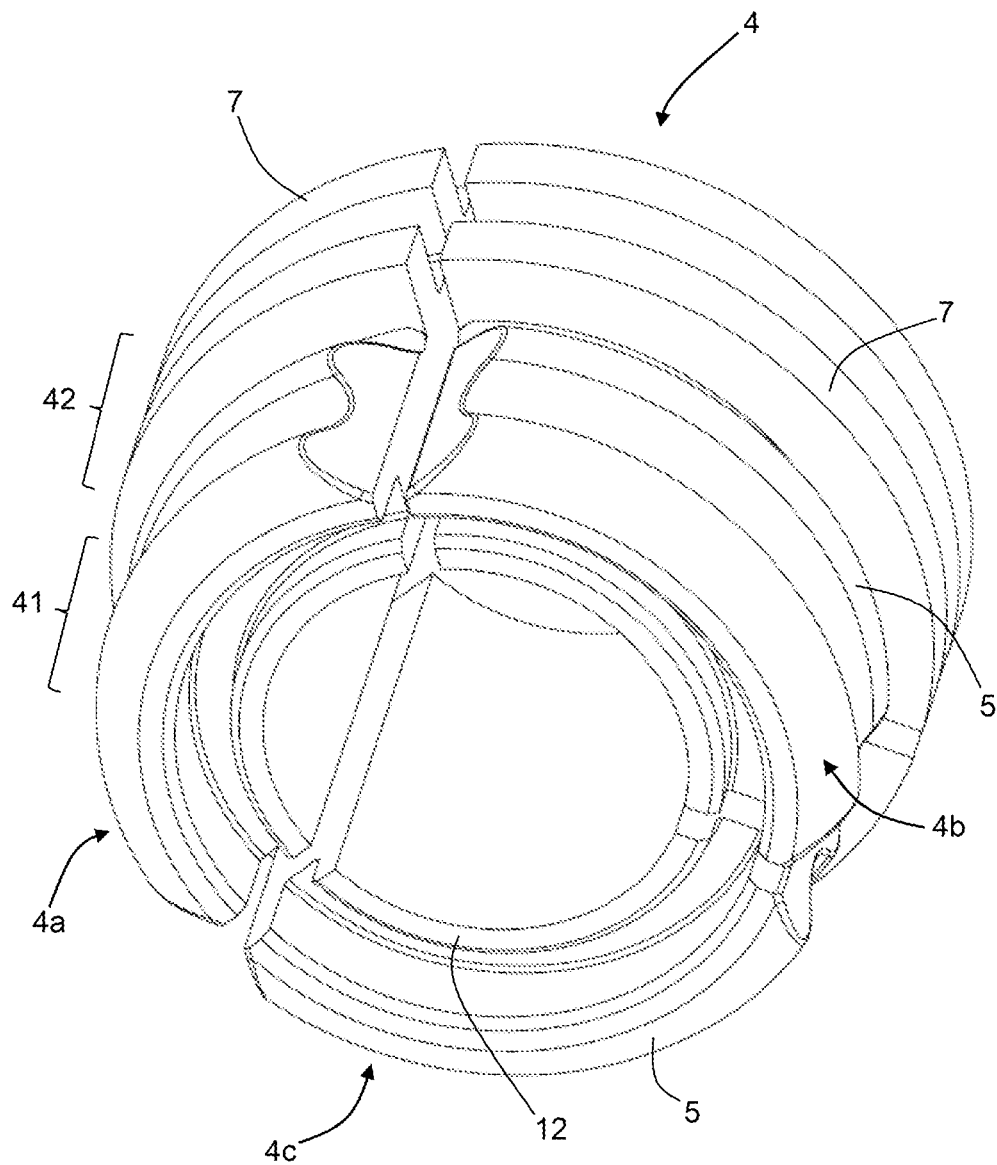
FIG. 4 is a perspective view from below of a preform handling device tip in accordance with a first embodiment of the invention.

In accordance with a first embodiment, as illustrated in FIG. 4, the tip 4 comprises at least two angular sectors 4a, 4b.

To be more precise, the tip 4 comprises a first angular sector 4a, a second angular sector 4b and a third angular sector 4c each extending over approximately 120 degrees.

The angular sectors 4a, 4b, 4c are retained on the mandrel 3 by cooperation between the annular groove 11 and the annular bead 12 on the one hand and by inserting them in a shoulder 61 formed in the heatsink 6 on the other hand.

The heatsink 6 is for its part fixed onto the mandrel 3, which makes it possible to allow movement of the tip 4 between the shoulder 10 of the mandrel 3 and the heatsink 6.

Figure 5:
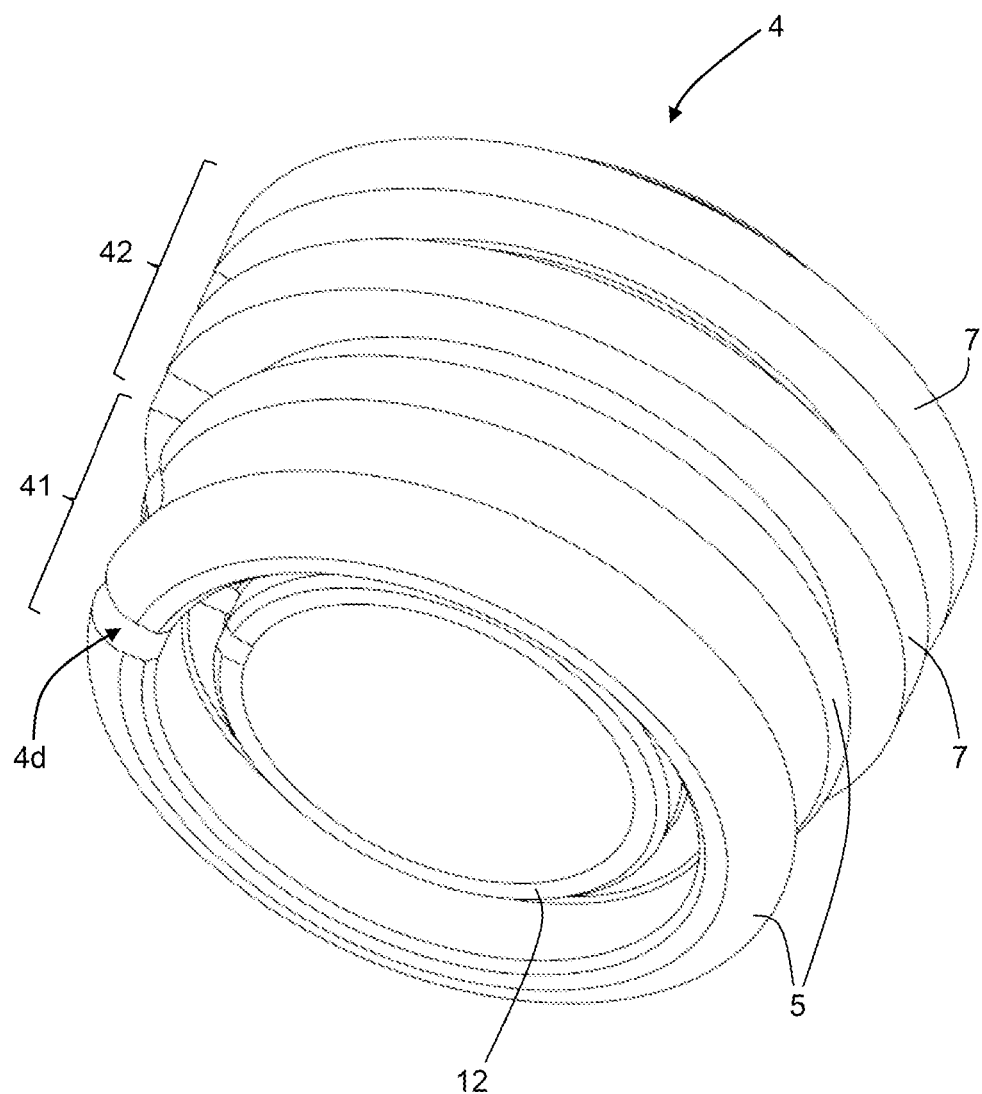
FIG. 5 is a perspective view from below of a tip of the preform handling device in accordance with a second embodiment of the invention.

In accordance with a second embodiment illustrated in FIG. 5, the tip 4 is formed of a single angular sector including a slot 4d to allow elastic deformation of the tip 4, in particular during loading and stripping, that is to say during handling and releasing of the preform 2.

The single angular sector is retained on the mandrel 3 by cooperation between the annular groove 11 and the annular bead 12 on the one hand and its insertion in the shoulder 61 formed in the heatsink 6 on the other hand.

The handling device 1 that has just been described, in particular the presence of the cooling part 42, makes it possible to ensure adequate cooling of the tip 4 between heating two preforms 2, to the benefit of the integrity of the neck of the preforms.

In fact, the presence of the raised portions 7 on the cooling part 42 of the tip 4 makes it possible to facilitate the thermal exchanges between the tip 4 and the surrounding air and therefore the cooling of the tip 4.

What is claimed is:

1. A device for handling preforms for heating units, comprising:
a mandrel defining a rotation axis of the preforms;
a tip mounted at a first end of the mandrel and having a part penetrating into the neck of the preforms;
a rubbing contact rigidly connected to the tip, and
a heatsink rigidly connected to the mandrel and intended to come into contact with the tip, wherein
the tip further comprises a cooling part axially in line with the penetrating part, the cooling part including at least one thermal exchange raised portion in contact with the surrounding air, and in that the tip is mounted to be mobile on the mandrel and wherein the penetrating part and the cooling part form a one-piece assembly.

2. The device as claimed in the claim 1, wherein the cooling part comprises at least two raised portions spaced axially from one another.

3. The device as claimed in claim 1, wherein each of the raised portions is formed of an annular flange that extends radially around the mandrel.

4. The device as claimed in claim 3, wherein at least one of the raised portions of the cooling part has an overall dimension greater than an overall dimension of the penetrating part.

5. The device as claimed in claim 1, wherein the tip comprises at least two angular sectors in each of which the penetrating part and the cooling part of the tip are in one piece.

6. The device as claimed in claim 1, wherein the penetrating part and the cooling part of the tip are integral with one another.

7. The device as claimed in claim 1, wherein the rubbing contact means are integrated into the penetrating part and take the form of at least one radial projection.

8. The device as claimed in claim 1, wherein the mandrel has a reflective solid surface at its first end to reflect luminous radiation from luminous radiation sources of a heating units.

9. The device as claimed in claim 1, wherein the mandrel has at its first end a shoulder intended to form an abutment in translation of the tip on the mandrel.

10. The device as claimed in claim 9, wherein the shoulder of the mandrel includes an annular groove in which is received an annular bead carried by the penetrating part of the tip.

11. A unit for heating preforms comprising at least one device for handling preforms as claimed in claim 1.

12. A device for handling preforms for heating units, comprising:
a mandrel defining a rotation axis of the preforms;
a tip mounted at a first end of the mandrel and having a part penetrating into the neck of the preforms;
a rubbing contact rigidly connected to the tip, and
a heatsink rigidly connected to the mandrel and intended to come into contact with the tip, wherein
the tip further comprises a cooling part axially in line with the penetrating part, the cooling part including at least one thermal exchange raised portion in contact with the surrounding air, and in that the tip is mounted to be mobile on the mandrel, wherein the mandrel has a reflective solid surface at its first end to reflect luminous radiation from luminous radiation sources of a heating units.

13. The device as claimed in claim 12, wherein the mandrel has at its first end a shoulder intended to form an abutment in translation of the tip on the mandrel.

14. The device as claimed in claim 13, wherein the shoulder of the mandrel includes an annular groove in which is received an annular bead carried by the penetrating part of the tip.

* * * * *